(12) United States Patent
Kusase

(10) Patent No.: US 10,090,742 B2
(45) Date of Patent: Oct. 2, 2018

(54) ROTATING ELECTRIC MACHINE

(71) Applicant: DENSO CORPORATION, Kariya, Aichi-pref. (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 310 days.

(21) Appl. No.: 15/166,408

(22) Filed: May 27, 2016

(65) Prior Publication Data

US 2016/0352203 A1     Dec. 1, 2016

(30) Foreign Application Priority Data

May 28, 2015  (JP) ................................. 2015-108120

(51) Int. Cl.
| | |
|---|---|
| H02K 19/00 | (2006.01) |
| H02K 19/10 | (2006.01) |
| H02K 1/24 | (2006.01) |
| H02K 19/12 | (2006.01) |
| H02K 21/04 | (2006.01) |
| H02K 21/12 | (2006.01) |
| H02K 1/27 | (2006.01) |
| H02K 16/04 | (2006.01) |

(52) U.S. Cl.
CPC .......... *H02K 19/103* (2013.01); *H02K 1/246* (2013.01); *H02K 1/27* (2013.01); *H02K 19/12* (2013.01); *H02K 21/046* (2013.01); *H02K 21/048* (2013.01); *H02K 21/12* (2013.01); *H02K 16/04* (2013.01)

(58) Field of Classification Search
CPC ...... H02K 19/103; H02K 21/04; H02K 21/12; H02K 19/12; H02K 16/04
See application file for complete search history.

(56) References Cited

U.S. PATENT DOCUMENTS

| | | | | | |
|---|---|---|---|---|---|
| 5,682,073 | A | * | 10/1997 | Mizuno ................ | H02K 21/046 310/156.25 |
| 5,731,647 | A | * | 3/1998 | Schuller ............... | H02K 1/2746 310/114 |
| 6,459,185 | B1 | * | 10/2002 | Ehrhart .................... | H02K 1/20 310/156.35 |
| 6,724,115 | B2 | * | 4/2004 | Kusase .................... | H02K 1/27 310/113 |
| 8,860,281 | B2 | * | 10/2014 | Maekawa .............. | H02K 19/24 310/112 |

(Continued)

FOREIGN PATENT DOCUMENTS

| | | |
|---|---|---|
| JP | H03-139156 A | 6/1991 |
| JP | 2001-145209 A | 5/2001 |

(Continued)

*Primary Examiner* — Robert W Horn
(74) *Attorney, Agent, or Firm* — Oliff PLC

(57) ABSTRACT

A rotating electric machine includes at least one multi-phase coil, at least one armature core having the at least one multi-phase coil wound thereon, and at least one rotor rotatably disposed and having a plurality of magnetic poles facing the at least one armature core. The at least one multi-phase coil has at least one coil end part protruding from the at least one armature core and surrounded by at least one magnetic circuit formed in the rotating electric machine. There are a plurality of gaps formed between the at least one armature core and the at least one rotor.

14 Claims, 8 Drawing Sheets

(56) References Cited

U.S. PATENT DOCUMENTS

| | | | |
|---|---|---|---|
| 9,006,949 B2* | 4/2015 | Kusase | H02K 1/16 |
| | | | 310/112 |
| 9,143,024 B2* | 9/2015 | Kusase | H02K 3/28 |
| 9,407,116 B2* | 8/2016 | Kondou | H02K 1/276 |
| 9,627,935 B2* | 4/2017 | Fukushima | H02K 3/12 |
| 9,806,569 B2* | 10/2017 | Yokota | H02K 21/04 |
| 2011/0285238 A1* | 11/2011 | Kusase | H02K 16/04 |
| | | | 310/156.48 |
| 2013/0099618 A1 | 4/2013 | Kusase | |
| 2013/0119789 A1 | 5/2013 | Maekawa et al. | |
| 2013/0221788 A1 | 8/2013 | Yokota et al. | |
| 2014/0159532 A1* | 6/2014 | Kondou | H02K 1/276 |
| | | | 310/156.53 |
| 2015/0137655 A1* | 5/2015 | Maekawa | H02K 1/30 |
| | | | 310/216.129 |
| 2016/0352203 A1* | 12/2016 | Kusase | H02K 19/103 |
| 2017/0018981 A1* | 1/2017 | Kusase | H02K 21/046 |

FOREIGN PATENT DOCUMENTS

| | | |
|---|---|---|
| JP | 2001-268870 A | 9/2001 |
| JP | 2004-194383 A | 7/2004 |

* cited by examiner

ROTATING ELECTRIC MACHINE

CROSS-REFERENCE TO RELATED APPLICATION

This application is based on and claims priority from Japanese Patent Application No. 2015-108120 filed on May 28, 2015, the content of which is hereby incorporated by reference in its entirety into this application.

BACKGROUND

1 Technical Field

The present invention relates to rotating electric machines which include at least one multi-phase coil, at least one armature core and a plurality of magnetic poles.

2 Description of Related Art

To achieve a small size, high performance, long service life and high reliability, rotating electric machines generally employ a brushless structure with a permanent magnet field. On the other hand, for usage in a wide rotational speed range, it is necessary to vary the field strength. However, with the aforementioned permanent magnet field, it is difficult to vary the field strength; thus losses occur and there are limits on the characteristics of the rotating electric machines. Therefore, one may consider employing a winding field instead of the permanent magnet field. However, the space required for receiving a winding is generally larger than that required for receiving a permanent magnet. Moreover, a winding is generally required to be surrounded by a core. Consequently, a considerably large volume is required for employing the winding field. As a result, it is difficult to achieve the original object, i.e., to achieve a small size and high permeance.

Japanese Patent Application Publication No. JP2013212037A discloses a hybrid excitation rotating electric machine that has an exciting coil arranged in a suitable position, thereby forming a desired magnetic circuit without increasing the size of the rotating electric machine; the exciting coil functions to excite magnetic poles that are not magnetized by permanent magnets. More specifically, the hybrid excitation rotating electric machine includes: a rotor having first and second rotor cores; a stator that generates a rotating magnetic field for rotating the rotor; and the exciting coil that protrudes radially inward from the stator so as to be arranged in a gap formed between the first and second rotor cores.

However, with the above configuration of the hybrid excitation rotating electric machine, the number of the rotor cores is equal to 2, thus increasing the parts count and size of the rotating electric machine. Moreover, the magnetomotive force of the exciting coil acts in a direction of weakening the magnetomotive forces of permanent-magnet magnetic poles. Consequently, when electric current supplied to the exciting coil is increased for the purpose of increasing the output of the rotating electric machine, the potentials of permanent magnets are suppressed.

SUMMARY

According to exemplary embodiments, there is provided a rotating electric machine which includes at least one multi-phase coil, at least one armature core having the at least one multi-phase coil wound thereon, and at least one rotor rotatably disposed and having a plurality of magnetic poles facing the at least one armature core. The at least one multi-phase coil has at least one coil end part protruding from the at least one armature core and surrounded by at least one magnetic circuit formed in the rotating electric machine. There are a plurality of gaps formed between the at least one armature core and the at least one rotor.

With the above configuration, it is possible to realize a brushless variable field without a field winding. Moreover, since there are formed the plurality of gaps, the number of torque-acting surfaces in the rotating electric machine is increased, thereby achieving a high output (e.g., high output torque or output electric power) of the rotating electric machine for its size.

In a first exemplary embodiment, the rotating electric machine further includes a housing in which the at least one multi-phase coil, the at least one armature core and the at least one rotor are received. The at least one rotor is a single rotor. The at least one armature core includes an outer armature core disposed radially outside the rotor and an inner armature core disposed radially inside the rotor. The at least one multi-phase coil includes an outer multi-phase coil wound on the outer armature core and an inner multi-phase coil wound on the inner armature core. The at least one coil end part includes a coil end part of the outer multi-phase coil protruding from the outer armature core and a coil end part of the inner multi-phase coil protruding from the inner armature core. The magnetic poles of the rotor include a plurality of first magnetic poles facing the outer armature core and a plurality of second magnetic poles facing the inner armature core. The housing has a first field yoke part facing the coil end part of the outer multi-phase coil and a second field yoke part facing the coil end part of the inner multi-phase coil. The at least one magnetic circuit includes first and second magnetic circuits. The first magnetic circuit is formed by the outer armature core, the first field yoke part of the housing and the first magnetic poles of the rotor so as to surround the coil end part of the outer multi-phase coil. The second magnetic circuit is formed by the inner armature core, the second field yoke part of the housing and the second magnetic poles of the rotor so as to surround the coil end part of the inner multi-phase coil. The plurality of gaps include an outer radial gap formed between the outer armature core and the rotor and an inner radial gap formed between the inner armature core and the rotor.

Moreover, in the first exemplary embodiment, the rotor is double-ring-structured to have a first ring-shaped part located on a radially outer side and a second ring-shaped part located on a radially inner side. The first ring-shaped part includes the first magnetic poles and serves as an entrance and exit of the first magnetic circuit. The second ring-shaped part includes the second magnetic poles and serves as an entrance and exit of the second magnetic circuit. The first and second ring-shaped parts are arranged so that the first magnetic poles are interleaved with the second magnetic poles. The first magnetic poles have a first polarity, and the second magnetic poles have a second polarity that is opposite to the first polarity.

Moreover, in the first exemplary embodiment, both the coil end parts of the outer and inner multi-phase coils are located on a first axial side of the outer and inner armature cores. The outer and inner multi-phase coils are electrically connected with each other on a second axial side of the outer and inner armature cores which is opposite to the first axial side.

The at least one rotor may further have a plurality of magnets each being arranged between one circumferentially-adjacent pair of the magnetic poles.

In a second exemplary embodiment, the at least one armature core is a single armature core. The at least one multi-phase coil is a single multi-phase coil wound on the armature core. The at least one coil end part is a coil end part of the multi-phase coil protruding from the armature core. The at least one rotor includes an outer rotor rotatably disposed radially outside the armature core and an inner rotor rotatably disposed radially inside the armature core. Each of the outer and inner rotors has a plurality of magnetic poles facing the armature core. The outer and inner rotors are connected with a soft-magnetic member on one axial side of the outer and inner rotors. The at least one magnetic circuit is a magnetic circuit that is formed by the armature core, the outer rotor, the soft-magnetic member and the inner rotor so as to surround the coil end part of the multi-phase coil. The plurality of gaps include an outer radial gap formed between the outer rotor and the armature core and an inner radial gap formed between the inner rotor and the armature core.

Moreover, in the second exemplary embodiment, the magnetic poles of the outer rotor are held by an annular nonmagnetic holding member.

Moreover, in the second exemplary embodiment, the armature core is segmented into a plurality of teeth that are circumferentially spaced from one another.

Preferably, the at least one multi-phase coil is comprised of a plurality of phase windings each of which is a wave-shaped full-pitch winding. The at least one multi-phase coil generates field magnetic flux upon supply of a DC component to at least one of the phase windings of the at least one multi-phase coil.

The rotating electric machine may further include an inverter that includes: an electric power converter having a plurality of full bridges each of which includes one of the phase windings of the at least one multi-phase coil therein; and a controller that controls the electric power converter to supply the DC component to the at least one of the phase windings of the at least one multi-phase coil.

The at least one multi-phase coil may be a three-phase coil, and the phase windings of the three-phase coil may be Y-connected to define a neutral point therebetween. The electric power converter may have a first transistor connected to the neutral point of the three-phase coil and a second transistor connected to one of the phase windings of the three-phase coil. The controller may control drives of the first and second transistors to supply the DC component to the one of the phase windings of the three-phase coil.

The controller may control the electric power converter to perform an intermittent DC energization of the at least one multi-phase coil, with phase currents respectively supplied to the phase windings of the at least one multi-phase coil offset in phase from each other, thereby supplying the DC component to the at least one of the phase windings of the at least one multi-phase coil. In this case, it is preferable that the intermittent DC energization is a unidirectional pulse energization.

Otherwise, the rotating electric machine may further include a half-wave rectifier that half-wave-rectifies multi-phase electric power generated in the at least one multi-phase coil into DC power and outputs the obtained DC power.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
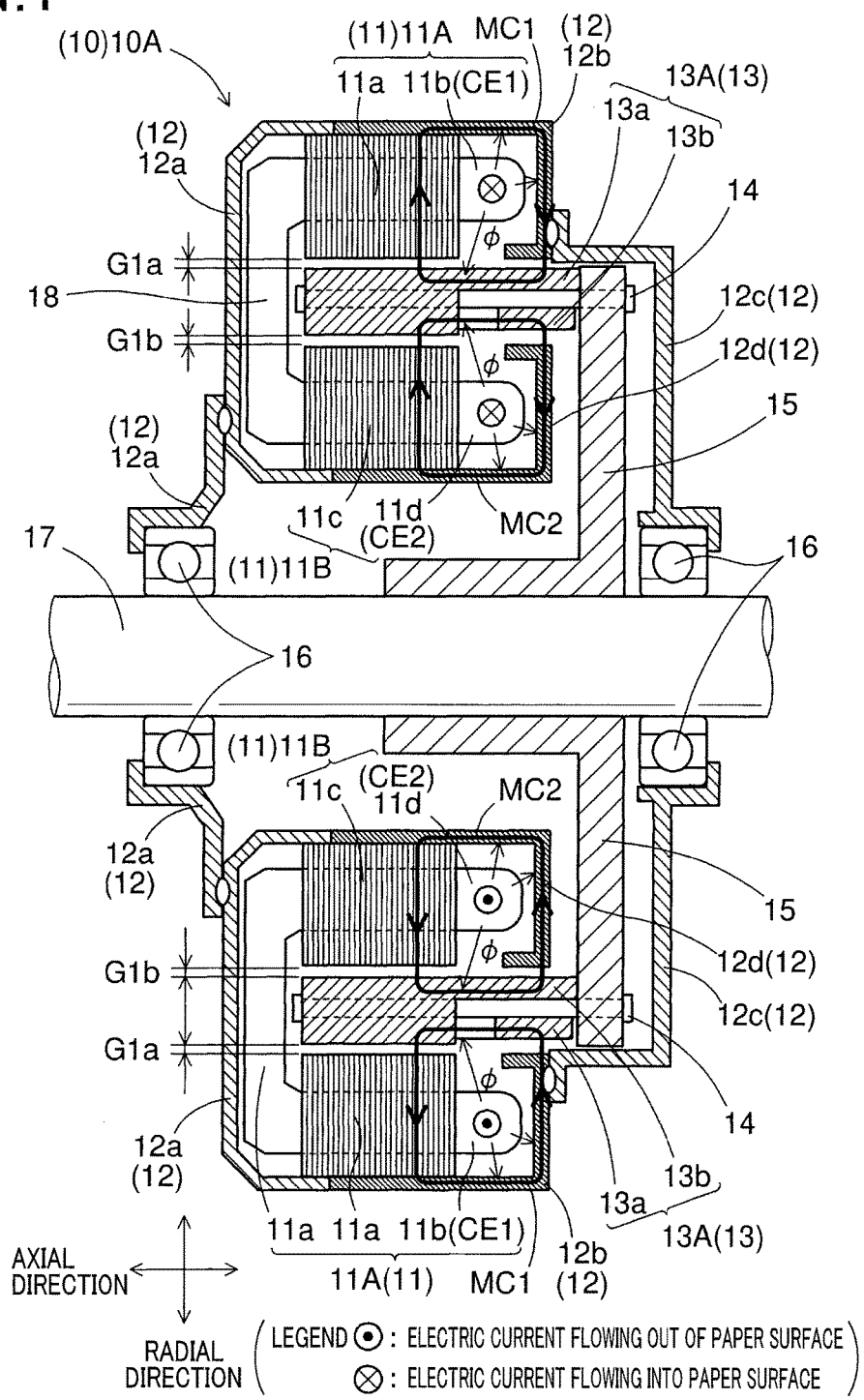
FIG. 1 is a schematic cross-sectional view of a rotating electric machine according to a first embodiment.

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a double-stator rotating electric machine 10A according to a first embodiment. The double-stator rotating electric machine 10A is an example of a rotating electric machine 10 according to the present invention.

In addition, the rotating electric machine 10 according to the present invention may be an electric motor, an electric generator or a motor-generator that selectively functions either as an electric motor or as an electric generator.

As shown in FIG. 1, the rotating electric machine 10A includes an outer armature (or stator) 11A, an inner armature (or stator) 11B, a rotor 13A, a pair of bearings 16 and a rotating shaft 17, all of which are received in a housing 12.

In addition, the upper half of FIG. 1 shows a cross section of an upper half of the rotating electric machine 10A which is taken to include a cross section of a first ring member 13a;

the lower half of FIG. 1 shows a cross section of a lower half of the rotating electric machine 10A which is taken to include a cross section of a second ring member 13b.

The housing 12 may be formed of any suitable material into any suitable shape. In the present embodiment, the housing 12 is formed to have nonmagnetic parts 12a and 12c and field yoke parts 12b and 12d. Moreover, the housing 12 supports, at least, an outer armature core (or outer stator core) 11a and an inner armature core (or inner stator core) 11c which are fixed to the housing 12. In addition, the housing 12 rotatably supports the rotating shaft 17 via the pair of bearings 16.

The outer and inner armatures 11A and 11B are examples of an armature (or stator) 11 according to the present invention. The outer armature 11A is located radially outside the rotor 13A, while the inner armature 11B is located radially inside the rotor 13A. That is, the outer and inner armatures 11A and 11B are arranged so as to have the rotor 13A interposed therebetween.

The outer armature 11A includes the outer armature core 11a and an outer multi-phase coil 11b. The outer armature core 11a is fixed to the nonmagnetic part 12a and the field yoke part 12b of the housing 12, which are located radially outside the outer armature core 11a. Though not shown in the figures, the outer armature core 11a has a plurality of teeth and a plurality of slots formed therein. The outer multi-phase coil 11b is wound on the outer armature core 11a so as to be received in the slots of the outer armature core 11a.

The inner armature 11B includes the inner armature core 11c and an inner multi-phase coil 11d. The inner armature core 11c is fixed to the nonmagnetic part 12a and the field yoke part 12d of the housing 12, which are located radially inside the inner armature core 11c. Though not shown in the figures, the inner armature core 11c has a plurality of teeth and a plurality of slots formed therein. The inner multi-phase coil 11d is wound on the inner armature core 11c so as to be received in the slots of the inner armature core 11c.

In addition, each of the outer and inner armature cores 11a and 11c may be formed of a magnetic material in any suitable way. For example, each of the outer and inner armature cores 11a and 11c may be formed by laminating a plurality of magnetic steel sheets. Alternatively, each of the outer and inner armature cores 11a and 11c may also be formed of a magnetic material into a single piece.

The outer multi-phase coil 11b corresponds to an outer armature coil (or outer stator coil). The inner multi-phase coil 11d corresponds to an inner armature coil (or inner stator coil). The outer and inner multi-phase coils 11b and 11d are wound respectively on the outer and inner armature cores 11a and 11c so that electric current flows in the outer and inner multi-phase coils 11b and 11d in directions as shown in FIG. 1.

Moreover, the outer and inner multi-phase coils 11b and 11d are connected by a plurality of bridging wires 18 on one axial side (i.e., on the left side in FIG. 1) of the outer and inner armature cores 11a and 11c so that part or the whole of the outer multi-phase coil 11b is integrated with part or the whole of the inner multi-phase coil 11d into one piece. The bridging wires 18 are made of the same electrically-conductive material as the outer and inner multi-phase coils 11b and 11d.

In addition, an example of winding the outer and inner multi-phase coils 11b and 11d respectively on the outer and inner armature cores 11a and 11c will be described later (see FIG. 9). Electric drive control of the rotating electric machine 10A is performed by controlling a multi-phase alternating current supplied to the outer and inner multi-phase coils 11b and 11d.

The rotor 13A is an example of a rotor 13 according to the present invention. The rotor 13A includes a first ring-shaped part 13a and a second ring-shaped part 13b. Each of the first and second ring-shaped parts 13a and 13b is fixed by a plurality of fixing members 14 to a supporting member 15. The configuration of the first and second ring-shaped parts 13a and 13b will be described in detail later (see FIGS. 2-5). The supporting member 15 is fixed to the rotating shaft 17. That is, the rotor 13A is fixed, via the supporting member 15, to the rotating shaft 17 so as to rotate together with the rotating shaft 17. In addition, the supporting member 15 may be formed of a nonmagnetic material into any suitable shape (e.g., the shape of a disc).

The outer multi-phase coil 11b has a coil end part CE1 protruding from the outer armature core 11a. The inner multi-phase coil 11d has a coil end part CE2 protruding from the inner armature core 11c. Both the coil end parts CE1 and CE2 of the outer and inner multi-phase coils 11b and 11d are located on the opposite axial side of the outer and inner armature cores 11a and 11c to the bridging wires 18 (i.e., on the right side of the outer and inner armature cores 11a and 11c in FIG. 1).

Figure 3:
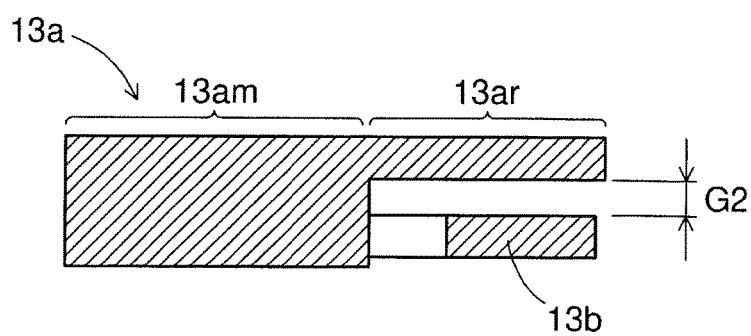
FIG. 3 is a cross-sectional view taken along the line III-III in FIG. 2.

Moreover, in the present embodiment, the coil end part CE1 of the outer multi-phase coil 11b is surrounded by a magnetic circuit MC1 that is formed by (or includes) the outer armature core 11a, the field yoke part 12b of the housing 12 and a plurality of magnetic poles of the rotor 13A (more specifically, a plurality of magnetic poles 13am of the first ring-shaped part 13a of the rotor 13A shown in FIG. 3). On the other hand, the coil end part CE2 of the inner multi-phase coil 11d is surrounded by a magnetic circuit MC2 that is formed by (or includes) the inner armature core 11c, the field yoke part 12d of the housing 12 and a plurality of magnetic poles of the rotor 13A (more specifically, a plurality of magnetic poles 13bm of the second ring-shaped part 13b of the rotor 13A shown in FIG. 4).

The magnetic circuits MC1 and MC2 are examples of a magnetic circuit MC according to the present invention. In operation, magnetic flux $\phi$ (including field magnetic flux $\phi f$ to be described later), which is generated upon supply of electric current to the outer and inner multi-phase coils 11b and 11d and the bridging wires 18, acts on the magnetic circuits MC1 and MC2, thereby increasing the output torque (or alternatively the output electric power) of the rotating electric machine 10A.

Between the outer armature core 11a and the rotor 13A, there is formed an outer radial gap G1a. Between the inner armature core 11c and the rotor 13A, there is formed an inner radial gap G1b. The sizes (or widths) of the outer and inner radial gaps G1a and G1b can be set to any suitable values to the extent that the magnetic circuits MC1 and MC2 can be formed. In addition, the size of the outer radial gap G1a may be set to be either equal to or different from the size of the inner radial gap G1b.

The outer armature core 11a has a radially inner surface facing the outer radial gap G1a. The inner armature core 11c has a radially outer surface facing the inner radial gap G1b. The rotor 13A has a radially outer surface facing the outer radial gap G1a and a radially inner surface facing the inner radial gap G1b. All of the radially inner surface of the outer armature core 11a, the radially outer surface of the inner armature core 11c and the radially outer and inner surfaces of the rotor 13A constitute torque-acting surfaces on which the magnetic flux $\phi$ flows and torque acts.

Figure 2:
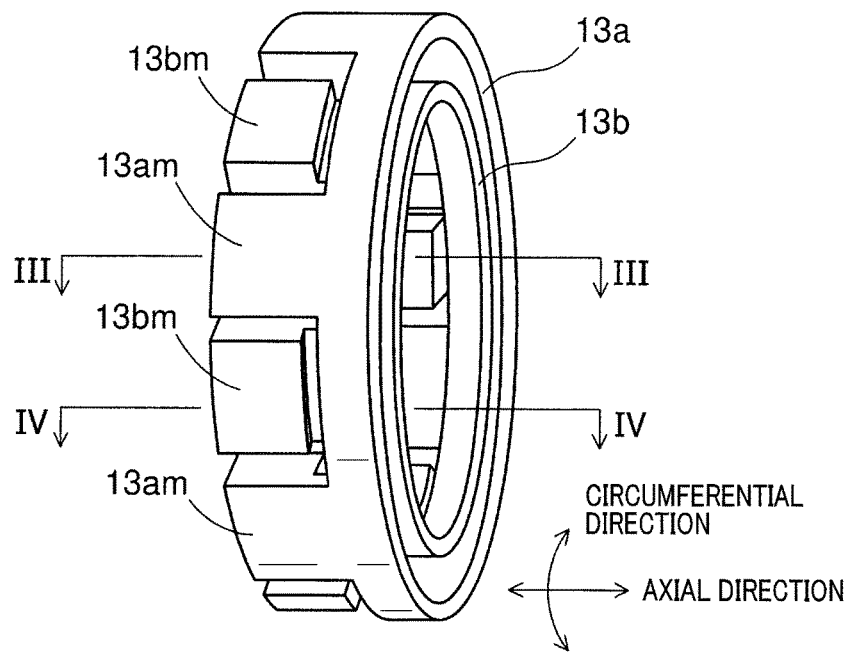
FIG. 2 is a perspective view illustrating a first configuration example of a rotor of the rotating electric machine according to the first embodiment.

Referring now to FIG. 2, the first ring-shaped part 13a of the rotor 13A has the plurality of magnetic poles 13am protruding in an axial direction of the rotor 13A (or in an axial direction of the rotating electric machine 10A) and spaced from one another in a circumferential direction of the rotor 13A (or in a circumferential direction of the rotating electric machine 10A). Similarly, the second ring-shaped part 13b of the rotor 13A has the plurality of magnetic poles 13bm protruding in the axial direction of the rotor 13A and spaced from one another in the circumferential direction of the rotor 13A. The number of the magnetic poles 13am and the number of the magnetic poles 13bm may be set to any suitable numbers. In the present embodiment, the number of the magnetic poles 13am and the number of the magnetic poles 13bm are set to be equal to each other.

Moreover, in the present embodiment, the first and second ring-shaped parts 13a and 13b of the rotor 13A are concentric double-ring-structured so that: the first ring-shaped part 13a is located on the radially outer side while the second ring-shaped part 13b is located on the radially inner side; and the magnetic poles 13am of the first ring-shaped part 13a are interleaved with the magnetic poles 13bm of the second ring-shaped part 13b. Consequently, each of the first and second ring-shaped parts 13a and 13b of the rotor 13A serves as an entrance and exit for the magnetic flux ϕ.

More specifically, referring back to FIG. 1, the first ring-shaped part 13a of the rotor 13A serves as an entrance and exit of the magnetic circuit MC1 that includes the outer armature core 11a and the field yoke part 12b of the housing 12. Consequently, the first ring-shaped part 13a has the magnetic flux ϕ flowing between it and the outer armature core 11a and the field yoke part 12b of the housing 12. On the other hand, the second ring-shaped part 13b of the rotor 13A serves as an entrance and exit of the magnetic circuit MC2 that includes the inner armature core 11c and the field yoke part 12d of the housing 12. Consequently, the second ring-shaped part 13b has the magnetic flux ϕ flowing between it and the inner armature core 11c and the field yoke part 12d of the housing 12.

Figure 4:
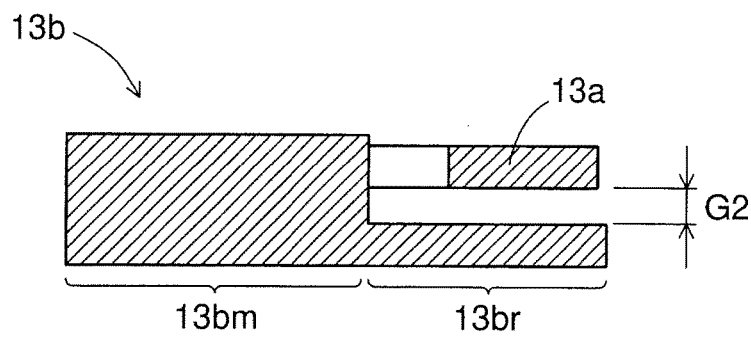
FIG. 4 is a cross-sectional view taken along the line IV-IV in FIG. 2.

FIGS. 3 and 4 together illustrate a first configuration example of the rotor 13A. More specifically, FIG. 3 mainly shows a cross section of the first ring-shaped part 13a of the rotor 13A, whereas FIG. 4 mainly shows a cross section of the second ring-shaped part 13b of the rotor 13A.

As shown in FIG. 3, the first ring-shaped part 13a has an annular main body 13ar and the plurality of magnetic poles 13am protruding from the main body 13ar axially toward one side (i.e., toward the left side in FIGS. 2 and 3) and radially inward.

As shown in FIG. 4, the second ring-shaped part 13b has an annular main body 13br and the plurality of magnetic poles 13bm protruding from the main body 13br axially toward the same side as the magnetic poles 13am of the first ring-shaped part 13a (i.e., toward the left side in FIGS. 2 and 4) and radially outward.

Moreover, the first and second ring-shaped parts 13a and 13b are arranged so as not to be in contact with each other. Between the first and second ring-shaped parts 13a and 13b, there is formed a radial gap G2 so as to prevent leakage of the magnetic flux ϕ therebetween.

The magnetic poles 13am of the first ring-shaped part 13a have a first polarity, whereas the magnetic poles 13bm of the second ring-shaped part 13b have a second polarity that is opposite to the first polarity. For example, when the first polarity is N (North), the second polarity is S (South). In contrast, when the first polarity is S, the second polarity is N.

Figure 5:
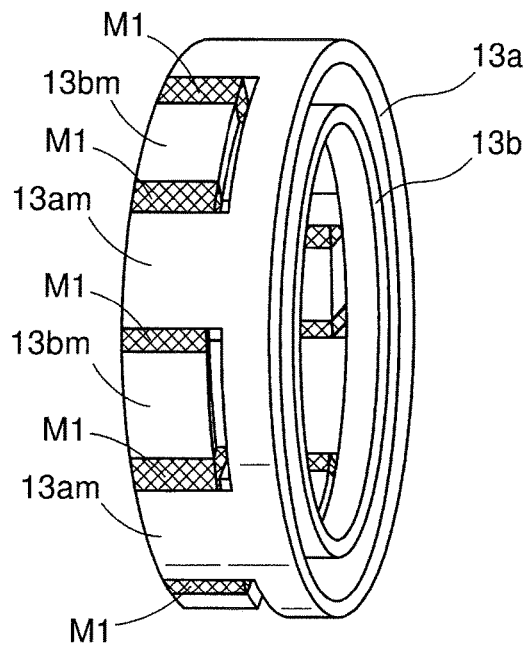
FIG. 5 is a perspective view illustrating a second configuration example of the rotor of the rotating electric machine according to the first embodiment.

FIG. 5 shows a second configuration example of the rotor 13A. Compared to the first configuration example described above, the rotor 13A in the second configuration example further has a plurality of permanent magnets M1 each being arranged between one circumferentially-adjacent pair of the magnetic poles 13am and 13bm of the first and second ring-shaped parts 13a and 13b. Consequently, the magnetic flux ϕ created by each of the permanent magnets M1 is allowed to act on the magnetic circuits MC1 and MC2 via the first and second ring-shaped parts 13a and 13b.

The above-described rotating electric machine 10A according to the present embodiment has the following advantages.

In the present embodiment, the rotating electric machine 10A includes the outer and inner multi-phase coils 11b and 11d, the outer and inner armature cores 11a and 11c respectively having the outer and inner multi-phase coils 11b and 11d wound thereon, and the rotor 13A rotatably disposed and having the magnetic poles 13am facing the outer armature core 11a and the magnetic poles 13bm facing the inner armature core 11c. The outer multi-phase coil 11b has the coil end part CE1 protruding from the outer armature core 11a and surrounded by the magnetic circuit MC1 formed in the rotating electric machine 10A. The inner multi-phase coil 11d has the coil end part CE2 protruding from the inner armature core 11c and surrounded by the magnetic circuit MC2 formed in the rotating electric machine 10A. There are the outer radial gap G1a formed between the outer armature core 11a and the rotor 13A and the inner radial gap G1b formed between the inner armature core 11c and the rotor 13A.

With the above configuration, it is possible to realize a brushless variable field without a field winding. Moreover, since there are formed the plurality of gaps (i.e., the outer and inner radial gaps G1a and G1b), the number of torque-acting surfaces in the rotating electric machine 10A is increased, thereby achieving a high output (e.g., high output torque or output electric power) of the rotating electric machine 10A for its size.

In the present embodiment, the rotating electric machine 10A further includes the housing 12 in which the outer and inner multi-phase coils 11b and 11d, the outer and inner armature cores 11a and 11c and the rotor 13A are received. The housing 12 had the field yoke part 12b facing the coil end part CE1 of the outer multi-phase coil 11b and the field yoke part 12d facing the coil end part CE2 of the inner multi-phase coil 11d. The magnetic circuit MC1, which surrounds the coil end part CE1 of the outer multi-phase coil 11b, is formed by the outer armature core 11a, the field yoke part 12b of the housing 12 and the magnetic poles 13am of the rotor 13A. The magnetic circuit MC2, which surrounds the coil end part CE2 of the inner multi-phase coil 11d, is formed by the inner armature core 11c, the field yoke part 12d of the housing 12 and the magnetic poles 13bm of the rotor 13A.

With the above configuration, it is possible to utilize both the magnetomotive forces respectively generated in the coil end parts CE1 and CE2 of the outer and inner multi-phase coils 11b and 11d.

In the present embodiment, the rotor 13A is double-ring-structured to have the first ring-shaped part 13a located on the radially outer side and the second ring-shaped part 13b located on the radially inner side. The first ring-shaped part 13a includes the magnetic poles 13am and serves as an entrance and exit of the magnetic circuit MC1. The second ring-shaped part 13b includes the magnetic poles 13bm and serves as an entrance and exit of the magnetic circuit MC2.

The first and second ring-shaped parts 13a and 13b are arranged so that the magnetic poles 13am of the first ring-shaped 13a are interleaved with the magnetic poles 13bm of the second ring-shaped part 13b. The magnetic poles 13am of the first ring-shaped 13a have the first polarity, whereas the magnetic poles 13bm of the second ring-shaped part 13b have the second polarity that is opposite to the first polarity.

Consequently, it becomes possible to configure the rotor 13A such that the magnetic poles 13am having the first polarity are arranged alternately with the magnetic poles 13bm having the second polarity in the circumferential direction of the rotor 13A.

In the present embodiment, both the coil end parts CE1 and CE2 of the outer and inner multi-phase coils 11b and 11d are located on a first axial side (i.e., the right side in FIG. 1) of the outer and inner armature cores 11a and 11c. The outer and inner multi-phase coils 11b and 11d are electrically connected with each other by the bridging wires 18 on a second axial side (i.e., the left side in FIG. 1) of the outer and inner armature cores 11a and 11c which is opposite to the first axial side.

With the above configuration, it is possible to minimize the axial length of the entire rotating electric machine 10A.

In the second configuration example shown in FIG. 5, the rotor 13A further has the permanent magnets M1 each being arranged between one circumferentially-adjacent pair of the magnetic poles 13am and 13bm of the first and second ring-shaped parts 13a and 13b.

With the above configuration, it is possible to utilize the magnetic flux ϕ created by the permanent magnets M1, thereby improving the performance of the rotating electric machine 10A.

Second Embodiment

A rotating electric machine 10B according to a second embodiment will be described with reference to FIGS. 6-8. The rotating electric machine 10B is another example of the rotating electric machine 10 according to the present invention.

The rotating electric machine 10B according to the present embodiment has a configuration similar to that of the rotating electric machine 10A according to the first embodiment. Accordingly, for the sake of avoiding redundancy, the differences of the rotating electric machine 10B from the rotating electric machine 10A will be mainly described.

In the first embodiment, the rotating electric machine 10A is configured as a double-stator rotating electric machine. In comparison, in the present embodiment, the rotating electric machine 10B is configured as a double-rotor rotating electric machine.

Figure 6:
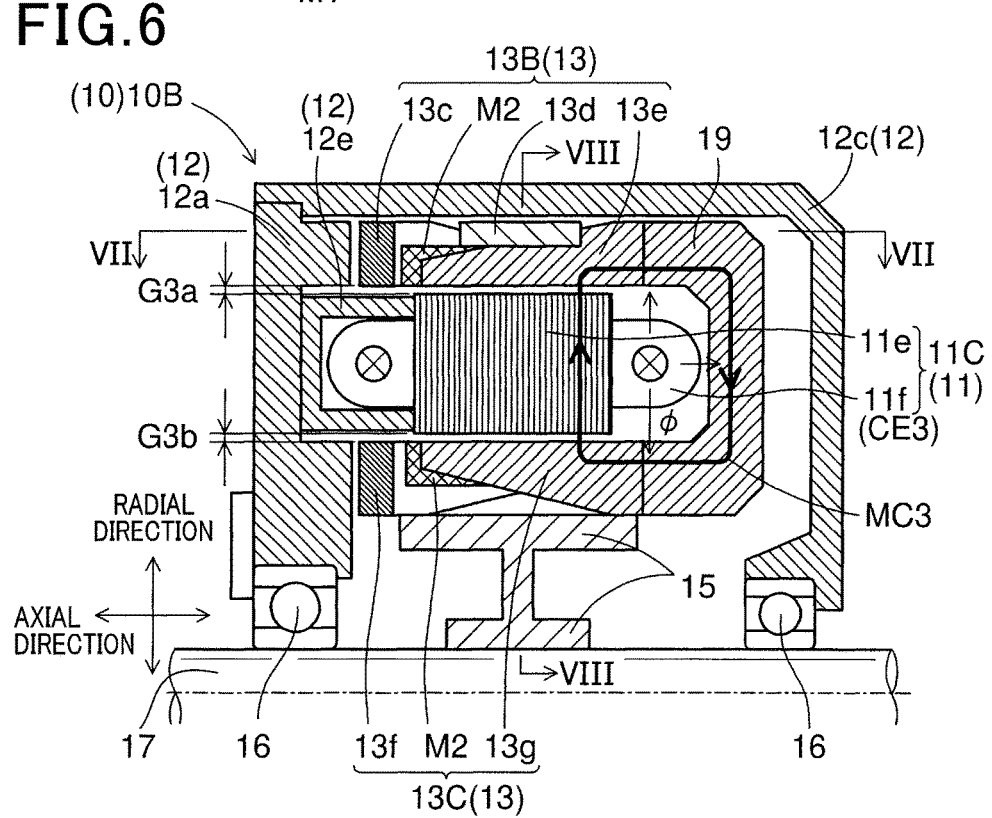
FIG. 6 is a schematic cross-sectional view of an upper half of a rotating electric machine according to a second embodiment.

Specifically, as shown in FIG. 6, the rotating electric machine 10B according to the present embodiment includes an armature (or stator) 11C, an outer rotor 13B, an inner rotor 13C, a pair of bearings 16 and a rotating shaft 17, all of which are received in a housing 12.

In addition, FIG. 6 shows a cross section of only an upper half of the rotating electric machine 10B; the cross section is taken to include cross sections of magnetic poles 13em of a second outer rotor member 13e and cross sections of magnetic poles 13gm of a second inner rotor member 13g, but not to include cross sections of magnetic poles 13cm of a first outer rotor member 13c and cross sections of magnetic poles 13fm of a first inner rotor member 13f.

Compared to the housing 12 in the first embodiment (see FIG. 1), the housing 12 in the present embodiment does not have the field yoke parts 12b and 12d. Instead, the housing 12 in the present embodiment further has a fixing part 12e for fixing the armature 11C to the housing 12. In addition, as the nonmagnetic parts 12a and 12c of the housing 12, the fixing part 12e is also formed of a nonmagnetic material.

The armature 11C is another example of the armature (or stator) 11 according to the present invention. The armature 11C includes an armature core 11e and a multi-phase coil 11f. The armature core 11e is fixed to the fixing part 12e of the housing 12. The armature core 11e has a plurality of teeth 11t and a plurality of slots 11s formed therein (see FIG. 8). The multi-phase coil 11f is wound on the armature core 11e so as to be received in the slots 11s of the armature core 11e.

In addition, the armature core 11e may be formed of a magnetic material in any suitable way. For example, the armature core 11e may be formed by laminating a plurality of magnetic steel sheets. Alternatively, the armature core 11e may also be formed of a magnetic material into a single piece.

The multi-phase coil 11f corresponds to an armature coil (or stator coil). The multi-phase coil 11f has a coil end part CE3 protruding from the armature core 11e on one axial side (i.e., the right side in FIG. 6) of the armature core 11e and surrounded by a magnetic circuit MC3. The magnetic circuit MC3 is formed by (or includes) the armature core 11e, the second outer rotor member 13e, a soft-magnetic member 19 and the second inner rotor member 13g.

The magnetic circuit MC3 is another example of the magnetic circuit MC according to the present invention. In operation, magnetic flux ϕ (including field magnetic flux ϕf to be described later), which is generated upon supply of electric current to the multi-phase coil 11f, acts on the magnetic circuit MC3, thereby increasing the output torque (or alternatively the output electric power) of the rotating electric machine 10B.

The outer and inner rotors 13B and 13C are examples of the rotor 13 according to the present invention. The outer rotor 13B is located radially outside the armature 11C, while the inner rotor 13C is located radially inside the armature 11C. That is, the outer and inner rotors 13B and 13C are arranged so as to have the armature 11C radially interposed therebetween.

The outer rotor 13B includes the first outer rotor member 13c and the second outer rotor member 13e. The inner rotor 13C includes the first inner rotor member 13f and the second inner rotor member 13g. The outer and inner rotors 13B and 13C are connected with and fixed to each other by the soft-magnetic member 19 on one axial side (i.e., the right side in FIG. 6) of the outer and inner rotors 13B and 13C. Moreover, the outer and inner rotors 13B and 13C are fixed to the rotating shaft 17 via a supporting member 15. Consequently, the outer and inner rotors 13B and 13C rotate together with the rotating shaft 17. In addition, the supporting member 15 may be formed of a nonmagnetic material into any suitable shape.

Between the outer rotor 13B and the armature core 11e, there is formed an outer radial gap G3a. Between the inner rotor 13C and the armature core 11e, there is formed an inner radial gap G3b. The sizes (or widths) of the outer and inner radial gaps G3a and G3b can be set to any suitable values to the extent that the magnetic circuit MC3 can be formed. In addition, the size of the outer radial gap G3a may be set to be either equal to or different from the size of the inner radial gap G3b.

The outer rotor 13B has a radially inner surface facing the outer radial gap G3a. The inner rotor 13C has a radially outer surface facing the inner radial gap G3b. The armature core 11e has a radially outer surface facing the outer radial gap G3a and a radially inner surface facing the inner radial gap G3b. All of the radially inner surface of the outer rotor 13B, the radially outer surface of the inner rotor 13C and the radially outer and inner surfaces of the armature core 11e constitute torque-acting surfaces on which the magnetic flux ϕ flows and torque acts.

Figure 7:
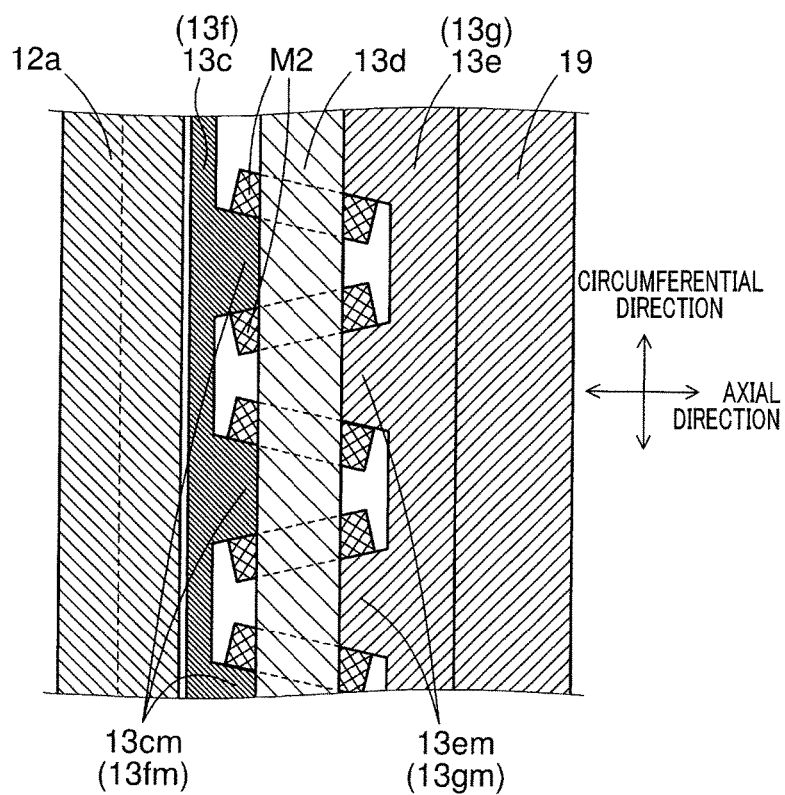
FIG. 7 is a cross-sectional view taken along the line VII-VII in FIG. 6 and developed in a circumferential direction of the rotating electric machine according to the second embodiment.

Referring now to FIG. 7, the configuration of the outer rotor 13B will be described.

As shown in FIG. 7, the first outer rotor member 13c has the plurality of magnetic poles 13cm protruding in an axial direction of the outer rotor 13B toward the second outer rotor member 13e and spaced from one another in a circumferential direction of the outer rotor 13B. Each of the magnetic poles 13cm is formed into a predetermined shape (e.g., a trapezoidal shape in the present embodiment). Similarly, the second outer rotor member 13e has the plurality of magnetic poles 13em protruding in the axial direction of the outer rotor 13B toward the first outer rotor member 13c and spaced from one another in the circumferential direction of the outer rotor 13B. Each of the magnetic poles 13em is formed into a predetermined shape (e.g., a trapezoidal shape in the present embodiment). The number of the magnetic poles 13cm and the number of the magnetic poles 13em may be set to any suitable numbers. In the present embodiment, the number of the magnetic poles 13cm and the number of the magnetic poles 13em are set to be equal to each other.

Moreover, in the present embodiment, the first and second outer rotor members 13c and 13e are assembled together so that the magnetic poles 13cm of the first outer rotor member 13c are interleaved with the magnetic poles 13em of the second outer rotor member 13e. Consequently, the magnetic poles 13cm of the first outer rotor member 13c are arranged alternately with the magnetic poles 13em of the second outer rotor member 13e in the circumferential direction of the outer rotor 13B.

Furthermore, the outer rotor 13B has a plurality of permanent magnets M2 each being arranged between one circumferentially-adjacent pair of the magnetic poles 13cm and 13em of the first and second outer rotor members 13c and 13e.

In addition, the magnetic poles 13cm and 13em of the first and second outer rotor members 13c and 13e are held by an annular holding member 13d that is formed of a nonmagnetic material.

The configuration of the inner rotor 13C is similar to the configuration of the outer rotor 13B described above.

Specifically, the first inner rotor member 13f is configured in the same manner as the first outer rotor member 13c; thus the first inner rotor member 13f has the plurality of magnetic poles 13fm (parenthesized in FIG. 7) configured in the same manner as the magnetic poles 13cm of the first outer rotor member 13c. The second inner rotor member 13g is configured in the same manner as the second outer rotor member 13e; thus the second inner rotor member 13g has the plurality of magnetic poles 13gm (parenthesized in FIG. 7) configured in the same manner as the magnetic poles 13em of the second outer rotor member 13e. Moreover, the first and second inner rotor members 13f and 13g are assembled together so that the magnetic poles 13fm of the first inner rotor member 13f are interleaved with the magnetic poles 13gm of the second inner rotor member 13g. Consequently, the magnetic poles 13fm of the first inner rotor member 13f are arranged alternately with the magnetic poles 13gm of the second inner rotor member 13g in the circumferential direction of the inner rotor 13C. Furthermore, the inner rotor 13C has a plurality of permanent magnets M2 each being arranged between one circumferentially-adjacent pair of the magnetic poles 13fm and 13gm of the first and second inner rotor members 13f and 13g.

In addition, the inner rotor 13C is fixed to the supporting member 15. Therefore, unlike the magnetic poles 13cm and 13em of the first and second outer rotor members 13c and 13e, no annular holding member 13d is needed for holding the magnetic poles 13fm and 13gm of the first and second inner rotor members 13f and 13g.

Next, the configuration of the armature core 11e will be described with reference to FIG. 8.

Figure 8:
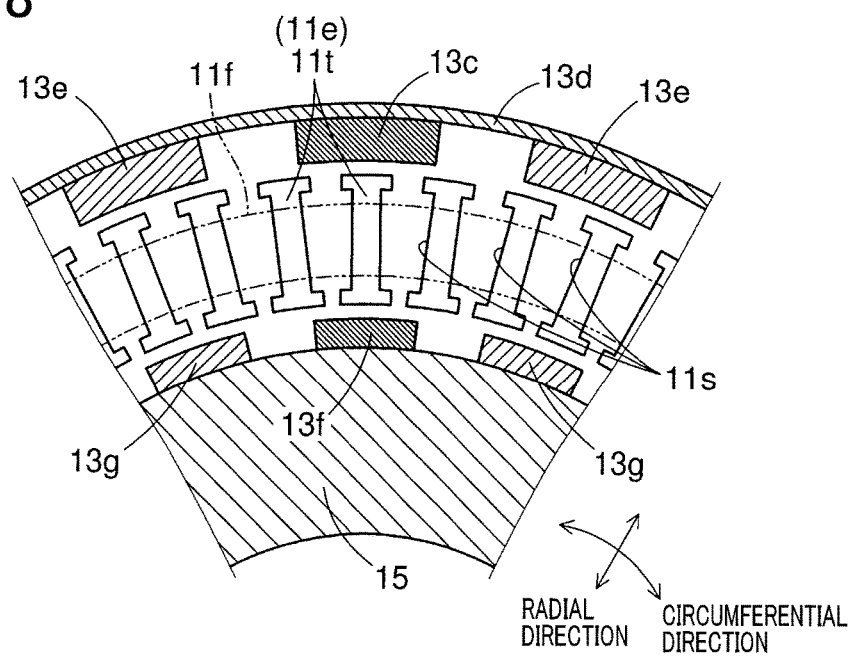
FIG. 8 is a cross-sectional view taken along the line VIII-VIII in FIG. 6.

It should be noted that: for the sake of simplicity, in FIG. 8, the multi-phase coil 11f is not depicted; instead, the multi-phase coil 11f is represented by two-dot chain lines. In addition, the housing 12 is omitted from FIG. 8.

As shown in FIG. 8, the armature core 11e has the plurality of teeth 11t each radially extending and spaced from one another in the circumferential direction. The armature core 11e also has the plurality of slots 11s each being formed between one circumferentially-adjacent pair of the teeth 11t. As described previously, the multi-phase coil 11f is wound on the armature core 11e so as to be received in the slots 11s.

Moreover, in the present embodiment, the armature core 11e is segmented into the teeth 11t and thus has no back yoke part circumferentially connecting the teeth 11t. Consequently, in the armature 11C, there is only radial flux linkage; that is, there is no circumferential flux linkage flowing between the teeth 11t.

The above-described rotating electric machine 10B according to the present embodiment has the following advantages.

In the present embodiment, the rotating electric machine 10B includes the multi-phase coil 11f, the armature core 11e having the multi-phase coil 11f wound thereon, the outer rotor 13B rotatably disposed radially outside the armature core 11e and having the magnetic poles 13cm and 13em facing the armature core 11e, and the inner rotor 13C rotatably disposed radially inside the armature core 11e and having the magnetic poles 13fm and 13gm facing the armature core 11e. The outer and inner rotors 13B and 13C are connected with each other by the soft-magnetic member 19 on one axial side of the outer and inner rotors 13B and 13C. The multi-phase coil 11f has the coil end part CE3 protruding from the armature core 11e and surrounded by the magnetic circuit MC3. The magnetic circuit MC3 is formed by the armature core 11e, the second outer rotor member 13e of the outer rotor 13B, the soft-magnetic member 19 and the second inner rotor member 13g of the inner rotor 13C. There are the outer radial gap G3a formed between the outer rotor 13B and the armature core 11e and the inner radial gap G3b formed between the inner rotor 13C and the armature core 11e.

With the above configuration, it is possible to realize a brushless variable field without a field winding. Moreover, since there are formed the plurality of gaps (i.e., the outer and inner radial gaps G3a and G3b), the number of torque-acting surfaces in the rotating electric machine 10B is increased, thereby achieving a high output (e.g., high output torque or output electric power) of the rotating electric machine 10B for its size. Furthermore, since the rotating electric machine 10B includes the single armature 11C, it is possible to minimize the number of multi-phase coils in the rotating electric machine 10B (i.e., one in the present embodiment).

In the present embodiment, the magnetic poles 13*cm* and 13*em* of the outer rotor 13B are held by the annular nonmagnetic holding member 13*d*.

Consequently, with the holding member 13*d*, it is possible to firmly secure the magnetic poles 13*cm* and 13*em* of the outer rotor 13B. Moreover, it is possible to lower magnetic reluctance occurring with rotation of the outer and inner rotors 13B and 13C, making it difficult for eddy current to occur.

In the present embodiment, the armature core 11*e* is segmented into the plurality of teeth 11*t* that are circumferentially spaced from one another.

With the segmented structure of the armature core 11*e*, it is possible to suppress magnetic flux leakage, making it easier to obtain reluctance torque.

Third Embodiment

A winding example of a multi-phase coil and an electric power converter 20A according to a third embodiment will be described with reference to FIGS. 9-11. The winding example and the electric power converter 20A can be applied to both the rotating electric machines 10A and 10B according to the first and second embodiments.

In addition, the electric power converter 20A is an example of an electric power converter 20 according to the present invention. The electric power converter 20A may be either built in the rotating electric machines 10A and 10B or arranged outside and electrically connected with the rotating electric machines 10A and 10B.

Figure 9:
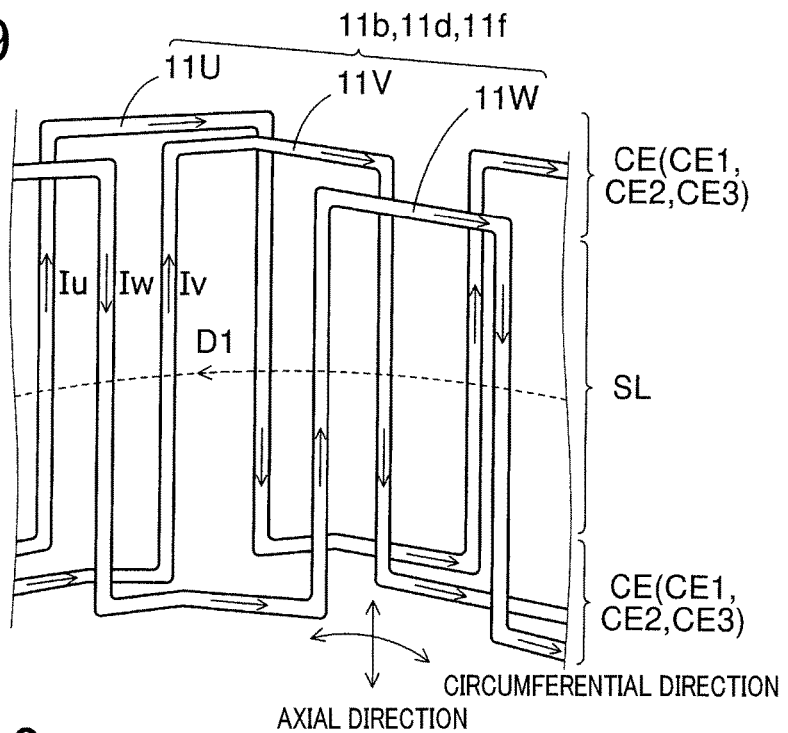
FIG. 9 is a schematic view illustrating a winding example of a multi-phase coil according to a third embodiment.

As shown in FIG. 9, the multi-phase coil is comprised of a U-phase winding 11U, a V-phase winding 11V and a W-phase winding 11W. The multi-phase coil may be any of the outer and inner multi-phase coils 11*b* and 11*d* included in the rotating electric machine 10A according to the first embodiment (see FIG. 1) and the multi-phase coil 11*f* included in the rotating electric machine 10B according to the second embodiment (see FIG. 6). In addition, for the sake of simplicity, the armature core (11*a*, 11*c* or 11*e*) is not shown in FIG. 9.

In the present embodiment, each of the U-phase, V-phase and W-phase windings 11U-11W is a wave-shaped full-pitch winding. More specifically, each of the U-phase, V-phase and W-phase windings 11U-11W is wound on the armature core so as to meander alternately in the axial and circumferential directions of the armature core at a circumferential pitch that is 180° in electrical angle.

In addition, in FIG. 9, the continuous-line arrows respectively indicate the directions of U-phase current Iu flowing in the U-phase winding 11U, V-phase current Iv flowing in the V-phase winding 11V and W-phase current Iw flowing in the W-phase winding 11W; the dashed-line arrow indicates the direction D1 of rotation of the rotor 13.

Moreover, as shown in FIG. 9, each of the U-phase, V-phase and W-phase windings 11U-11W has a plurality of in-slot portions SL and a plurality of turn portions (or end portions). Each of the in-slot portions SL is received in one of the slots of the armature core. Each of the turn portions is located outside the slots of the armature core and connects one circumferentially-adjacent pair of the in-slot portions SL. On each axial side of the armature core, all of those turn portions of the U-phase, V-phase and W-phase windings 11U-11W which are located on the axial side together constitute one coil end part CE (CE1, CE2 or CE3) of the multi-phase coil.

In addition, each of the U-phase, V-phase and W-phase windings 11U-11W may be formed of either a single continuous electric wire or a plurality of electric conductor segments.

Figure 10:
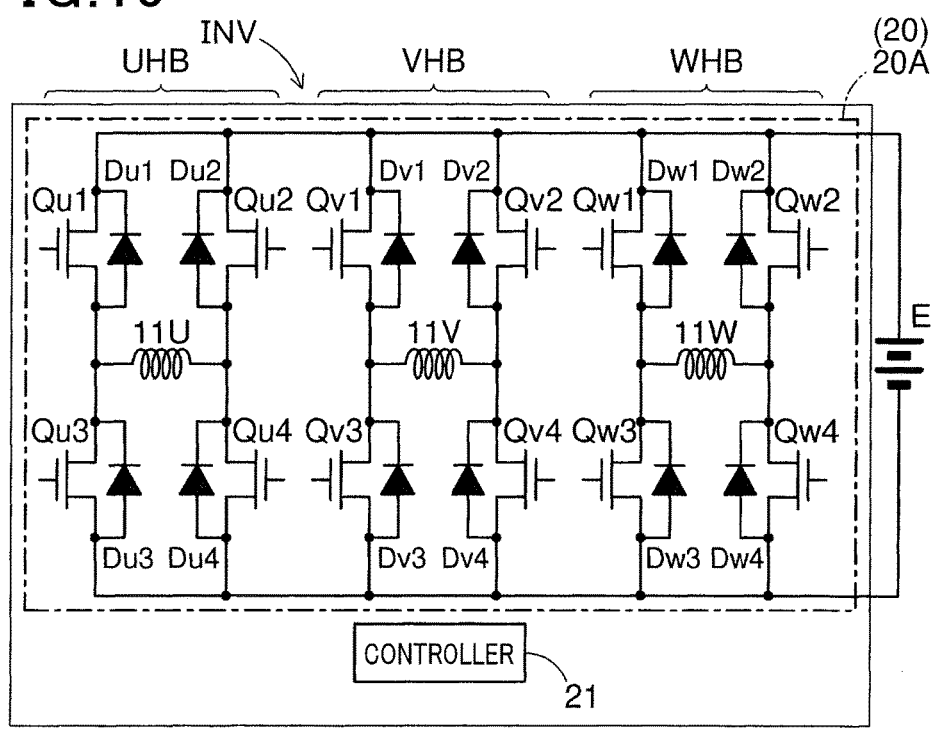
FIG. 10 is a circuit diagram of an electric power converter according to the third embodiment.

FIG. 10 shows the configuration of an inverter INV which includes the electric power converter 20A and a controller 21. In addition, for the sake of ease of understanding, the U-phase, V-phase and W-phase windings 11U-11W are also schematically shown in FIG. 10.

As shown in FIG. 10, the electric power converter 20A includes a U-phase H bridge UHB, a V-phase H bridge VHB and a W-phase H bridge WHB. In the present embodiment, all of the U-phase, V-phase and W-phase H bridges have the same configuration. Therefore, for the sake of avoiding redundancy, only the U-phase H bridge will be described hereinafter.

The U-phase H bridge UHB includes four transistors Qu1-Qu4 and four flyback diodes (or freewheeling diodes) Du1-Du4. The transistor Qu1 is connected in series with the transistor Qu3, while the transistor Qu2 is connected in series with the transistor Qu4. Between the junction point between the transistors Qu1 and Qu3 and the junction point between the transistors Qu2 and Qu4, there is connected the U-phase winding 11U so as to bridge the two junction points. The flyback diodes Du1-Du4 are connected respectively in parallel with the transistors Qu1-Qu4 to eliminate flyback. In addition, other semiconductor elements having a rectifying function, such as thyristors or MOSFETs, may be used instead of the flyback diodes Du1-Du4.

The drives of the transistors Qu1-Qu4, Qv1-Qv4 and Qw1-Qw4 are separately controlled by the controller 21. In addition, the transistors Qu1-Qu4, Qv1-Qv4 and Qw1-Qw4 may be of any type such that the drives thereof can be separately controlled. For example, each of the transistors Qu1-Qu4, Qv1-Qv4 and Qw1-Qw4 may be implemented by a FET (more specifically, MOSFET, JFET or MESFET), an IGBT, a GTO or a power transistor.

Figure 11:
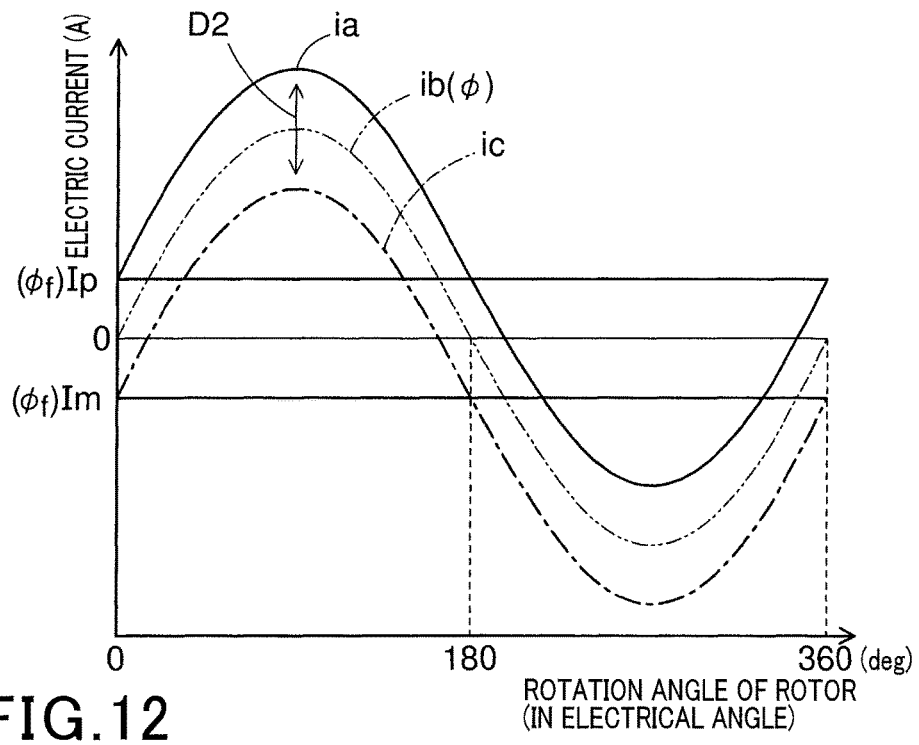
FIG. 11 is a waveform chart illustrating an example of superimposing a DC component on an alternating current.

The controller 21 performs a control as shown in FIG. 11, thereby energizing the multi-phase coil (i.e., the U-phase, V-phase and W-phase windings 11U-11W).

Specifically, in FIG. 11, there are shown the waveforms of three alternating currents ia, ib and ic, the periods of which are all equal to 360° in electrical angle. The alternating current ib, which is indicated by a two-dot chain line in FIG. 11, represents one phase of the multi-phase alternating current before superimposing a DC (Direct Current) component on the multi-phase alternating current. In other words, the alternating current ib represents a reference phase current supplied to the multi-phase coil. In addition, though the reference phase current has a sine waveform in the present embodiment, it may also have any other waveforms, such as a rectangular waveform.

The alternating current ia, which is indicated by a continuous line in FIG. 11, is obtained by superimposing a positive DC current Ip on the alternating current ib. In contrast, the alternating current ic, which is indicated by a one-dot chain line in FIG. 11, is obtained by superimposing a negative DC current Im on the alternating current ib. That is, according to the amplitude and direction of the superimposed DC component, the alternating current (or phase current supplied to the multi-phase coil) varies as indicated by an arrow D2 in FIG. 11.

The controller 21 may have any configuration such that it can perform a control of energizing the multi-phase coil through the superimposition of a DC component (e.g., Ip or Im) on the alternating current ib. More specifically, in the control, parameters are separately varied which include the amplitude, frequency and waveform of the alternating current ib, the amplitude of the DC current IP (IP>0) and the amplitude of the DC current Im (Im<0).

The alternating current ia or ic is supplied to the multi-phase coil on a phase basis. Normally, the alternating current ia or ic is supplied to any one of the U-phase, V-phase and W-phase windings 11U-11W of the multi-phase coil while the alternating current ib (i.e., the reference phase current) is supplied to the remaining two of the U-phase, V-phase and W-phase windings 11U-11W. That is, the alternating current is or is represents the U-phase current when it is supplied to the U-phase winding 11U, the V-phase current when supplied to the V-phase winding 11V, or the W-phase current when supplied to the W-phase winding 11W.

Consequently, by performing the above control, in the multi-phase coil (in particular, the coil end parts CE of the multi-phase coil), there are generated both the magnetic flux ϕ due to the multi-phase alternating current supplied to the multi-phase coil and the field magnetic flux ϕf due to the DC component Ip or Im superimposed on the multi-phase alternating current. The generated magnetic flux ϕ and field magnetic flux ϕf then act on the magnetic circuit (or circuits) MC formed in the rotating electric machine 10, thereby increasing the output torque (or alternatively the output electric power) of the rotating electric machine 10.

For example, in the first embodiment, in the outer and inner multi-phase coils 11b and 11d (in particular, the coil end parts CE1 and CE2 of the multi-phase coils 11b and 11d), there are generated both the magnetic flux ϕ due to the multi-phase alternating current supplied to the outer and inner multi-phase coils 11b and 11d and the field magnetic flux ϕf due to the DC component Ip or Im superimposed on the multi-phase alternating current. The generated magnetic flux ϕ and field magnetic flux ϕf then act on the magnetic circuits MC1 and MC2 (see FIG. 1), thereby increasing the output torque (or alternatively the output electric power) of the rotating electric machine 10A. Similarly, in the second embodiment, in the multi-phase coil 11f (in particular, the coil end part CE3 of the multi-phase coil 11f), there are generated both the magnetic flux ϕ due to the multi-phase alternating current supplied to the multi-phase coil 11f and the field magnetic flux ϕf due to the DC component Ip or Im superimposed on the multi-phase alternating current. The generated magnetic flux ϕ and field magnetic flux ϕf then act on the magnetic circuit MC3 (see FIG. 6), thereby increasing the output torque (or alternatively the output electric power) of the rotating electric machine 10B.

In addition, the functions of the controller 21 may be realized either by executing programs on a CPU (i.e., by software) or by operations of logic circuits (i.e., by hardware).

According to the present embodiment, it is possible to achieve the following advantageous effects.

In the present embodiment, the multi-phase coil is configured as a wave-shaped full-pitch coil. That is, each of the U-phase, V-phase and W-phase windings 11U-11W of the multi-phase coil is a wave-shaped full-pitch winding that is wound on the armature core so as to meander alternately in the axial and circumferential directions of the armature core at a circumferential pitch that is 180° in electrical angle. The multi-phase coil generates the field magnetic flux ϕf upon supply of the DC component Ip or Im to at least one (more particularly, to any one) of the U-phase, V-phase and W-phase windings 11U-11W of the multi-phase coil.

With the above configuration, it becomes possible to realize a brushless variable field without a field winding. Further, since no additional winding is needed for performing the field control, it becomes possible to minimize the size of the rotating electric machine 10. As a result, it becomes possible to achieve both minimization of the size of the rotating electric machine 10 and the brushless variable field. In addition, with the field magnetic flux ϕf, it is becomes to realize a DC excitation of the magnetic poles of the rotor (or rotors) of the rotating electric machine 10.

In the present embodiment, the inverter INV includes the electric power converter 20A and the controller 21. The electric power converter 20A has the U-phase, V-phase and W-phase H bridges each of which includes a corresponding one of the U-phase, V-phase and W-phase windings 11U-11W of the multi-phase coil therein. The controller 21 controls the electric power converter 20A so as to supply the DC component Ip or Im to at least one (more particularly, to any one) of the U-phase, V-phase and W-phase windings 11U-11W of the multi-phase coil.

With the above configuration, there is no bias in electric current supplied to the semiconductor elements of the electric power converter 20A. Consequently, the failure rate of the semiconductor elements is lowered, thereby improving the reliability of the electric power converter 20A.

Fourth Embodiment

An electric power converter 22 according to a fourth embodiment will be described with reference to FIG. 12. The electric power converter 22 can be applied, together with the winding example of a multi-phase coil described in the third embodiment, to both the rotating electric machines 10A and 10B according to the first and second embodiments.

In addition, the electric power converter 22 may be either built in the rotating electric machines 10A and 10B or arranged outside and electrically connected with the rotating electric machines 10A and 10B.

Figure 12:
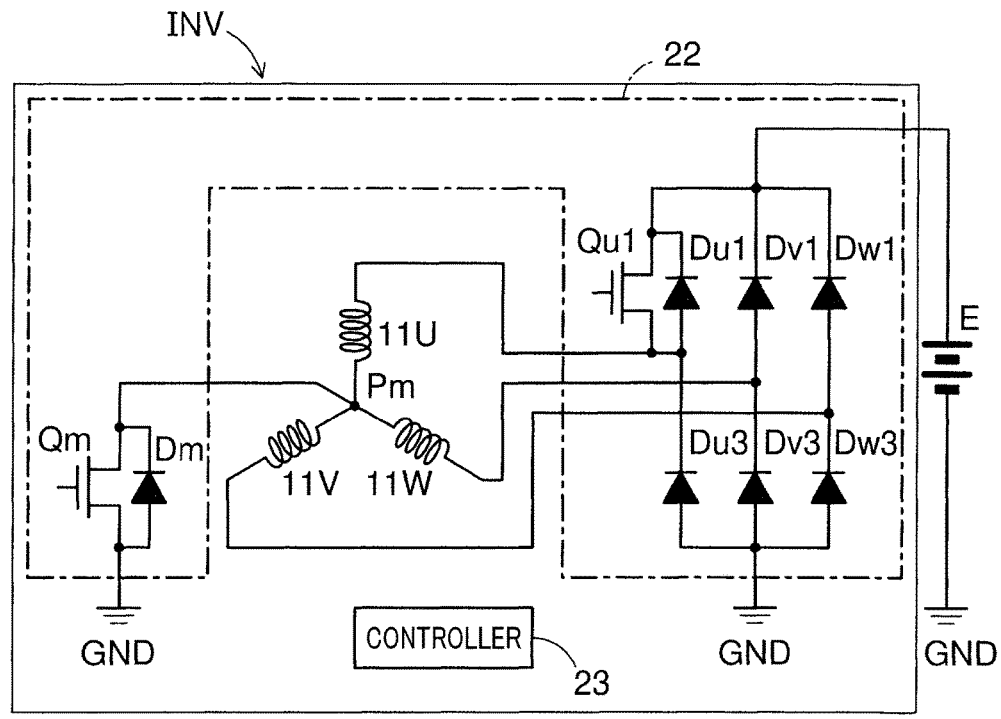
FIG. 12 is a circuit diagram of an electric power converter according to a fourth embodiment.

FIG. 12 shows the configuration of an inverter INV which includes the electric power converter 22 and a controller 23. In addition, for the sake of ease of understanding, the U-phase, V-phase and W-phase windings 11U-11W of a multi-phase coil are also schematically shown in FIG. 12. The multi-phase coil may be any of the outer and inner multi-phase coils 11b and 11d included in the rotating electric machine 10A according to the first embodiment (see FIG. 1) and the multi-phase coil 11f included in the rotating electric machine 10B according to the second embodiment (see FIG. 6).

In the present embodiment, the electric power converter 22 is configured to convert three-phase electric power generated in the multi-phase coil (i.e., the U-phase, V-phase and W-phase windings 11U-11W) into DC power and charge an electric power source E with the obtained DC power. The U-phase, V-phase and W-phase windings 11U-11W are Y-connected to define a neutral point Pm therebetween. In addition, the neutral point Pm may be realized by connecting the U-phase, V-phase and W-phase windings 11U-11W with an intermediate tap.

As shown in FIG. 12, the electric power converter 22 includes transistors Qu1 and Qm and diodes Du1, Du3, Dv1, Dv3, Dw1, Dw3 and Dm. The diodes Du1, Du3, Dv1, Dv3, Dw1 and Dw3 are connected to form a three-phase full-wave bridge. The diode Dm is connected between the neutral point Pm and the ground GND. In addition, the ground GND represents a common reference electric potential and is not necessarily set to 0[V].

Moreover, the transistor Qu1 is connected in parallel with the diode Du1. The transistor Qm is connected in parallel with the diode Dm. The drives of the transistors Qu1 and Qm are separately controlled by the controller 23.

The controller 23 may have any configuration such that it can control the electric power converter 22 to convert the three-phase electric power generated in the multi-phase coil into the DC power and charge the electric power source E with the obtained DC power. In this sense, the controller 23 corresponds to charging controlling means. Moreover, the configuration of the controller 23 may be either identical to or different from the configuration of the controller 21 in the third embodiment. Furthermore, the controller 23 may also be configured to have, in addition to its own functions, the functions of the controller 21. In addition, the functions of the controller 23 may be realized either by executing programs on a CPU (i.e., by software) or by operations of logic circuits (i.e., by hardware).

In addition, though not shown in the figures, at least one of the diodes Du3, Dv1, Dv3, Dw1 and Dw3 may have a transistor connected in parallel therewith and the drive of the transistor may be controlled by the controller 23. In the case of connecting a plurality of transistors respectively in parallel with the diodes Du3, Dv1, Dv3, Dw1 and Dw3, the resultant configuration corresponds to the left halves of the U-phase, V-phase and W-phase H bridges shown in FIG. 10.

According to the present embodiment, it is possible to achieve the following advantageous effects.

In the present embodiment, the multi-phase coil is a Y-connected three-phase coil. The electric power converter 22 has the transistor Qm connected between the neutral point Pm and the ground GND and the transistor Qu1 connected between the U-phase winding 11U and the electric power source E. The controller 23 controls the drives of the transistors Qm and Qu1, thereby supplying the DC component Ip or Im (see FIG. 11) to the U-phase winding 11U.

With the above configuration, it is possible to minimize the number of transistors required to generate the field magnetic flux $\phi f$.

Fifth Embodiment

An electric power converter 20B according to a fifth embodiment will be described with reference to FIGS. 13-14. The electric power converter 20B can be applied, together with the winding example of a multi-phase coil described in the third embodiment, to both the rotating electric machines 10A and 10B according to the first and second embodiments.

In addition, the electric power converter 20B is another example of the electric power converter 20 according to the present invention. The electric power converter 20B may be either built in the rotating electric machines 10A and 10B or arranged outside and electrically connected with the rotating electric machines 10A and 10B.

Figure 13:
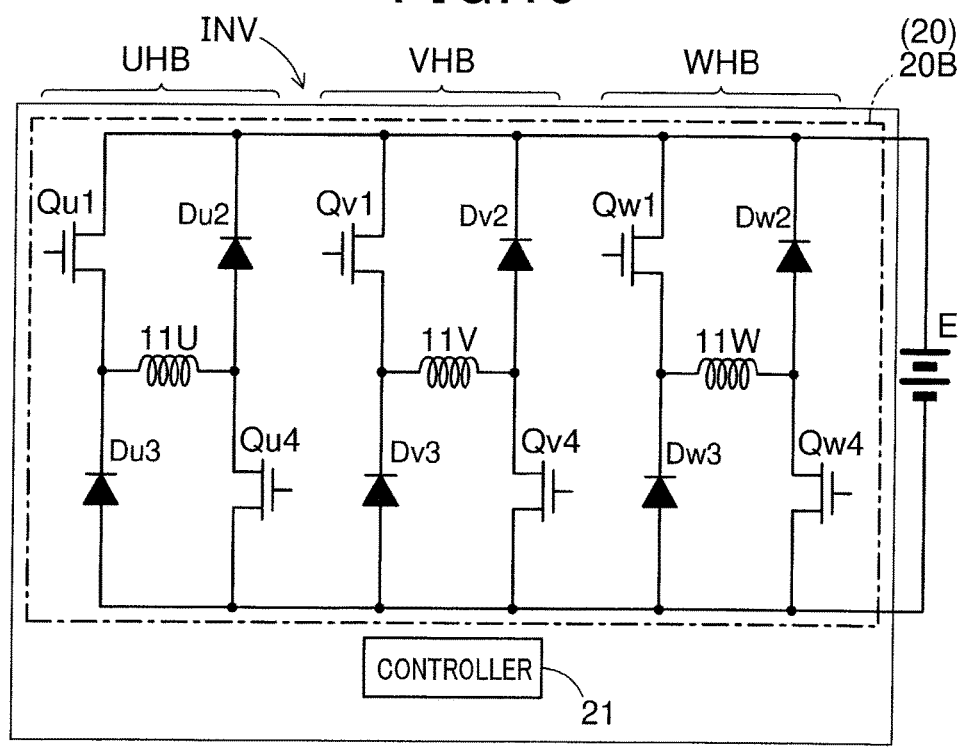
FIG. 13 is a circuit diagram of an electric power converter according to a fifth embodiment.

FIG. 13 shows the configuration of an inverter INV which includes the electric power converter 20B and a controller 21. In addition, for the sake of ease of understanding, the U-phase, V-phase and W-phase windings 11U-11W of a multi-phase coil are also schematically shown in FIG. 13. The multi-phase coil may be any of the outer and inner multi-phase coils 11b and 11d included in the rotating electric machine 10A according to the first embodiment (see FIG. 1) and the multi-phase coil 11f included in the rotating electric machine 10B according to the second embodiment (see FIG. 6).

As shown in FIG. 13, the electric power converter 20B includes a U-phase H bridge UHB, a V-phase H bridge VHB and a W-phase H bridge WHB. In the present embodiment, all of the U-phase, V-phase and W-phase H bridges have the same configuration. Therefore, for the sake of avoiding redundancy, only the U-phase H bridge will be described hereinafter.

The U-phase H bridge UHB includes two transistors Qu1 and Qu4 and two diodes Du2 and Du3. The transistor Qu1 is connected in series with the diode Du3, while the diode Du2 is connected in series with the transistor Qu4. Between the junction point between the transistor Qu1 and the diode Du3 and the junction point between the diode Du2 and the transistor Qu4, there is connected the U-phase winding 11U so as to bridge the two junction points.

The drives of the transistors Qu1, Qu4, Qv1, Qv4, Qw1 and Qw4 are separately controlled by the controller 21. In addition, the electric power converter 20B having the above configuration can be regarded as a unipolar drive circuit.

Figure 14:
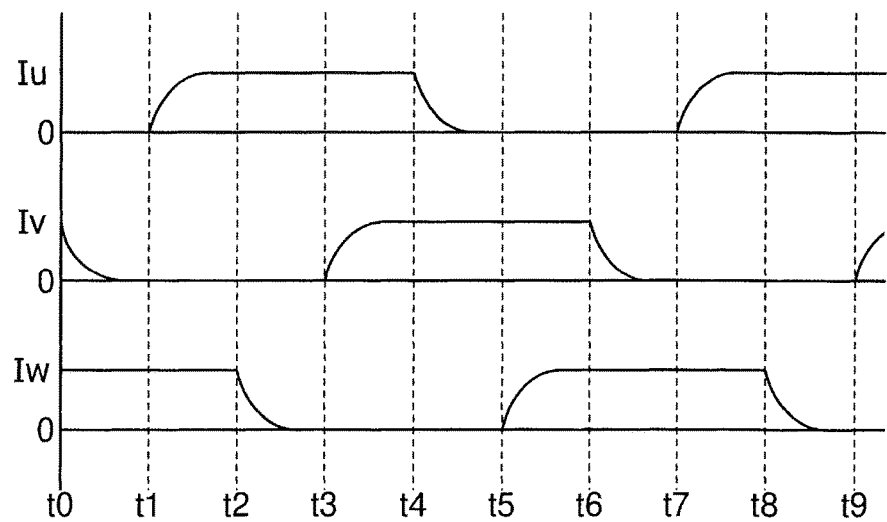
FIG. 14 is a waveform chart illustrating the waveforms of phase currents supplied to a three-phase coil by the electric power converter according to the fifth embodiment.

The controller 21 performs a control as shown in FIG. 14, thereby energizing the multi-phase coil (i.e., the U-phase, V-phase and W-phase windings 11U-11W).

Specifically, in FIG. 14, there are shown the waveforms of U-phase current Iu supplied to the U-phase winding 11U, V-phase current Iv supplied to the V-phase winding 11V and W-phase current Iw supplied to the W-phase winding 11W.

As shown in FIG. 14, in the present embodiment, the U-phase current Iu, the V-phase current Iv and the W-phase current Iw are DC pulses generated by intermittently driving the transistors Qu1, Qu4, Qv1, Qv4, Qw1 and Qw4 separately. Each of the DC pluses is a single pulse corresponding to a DC component. That is, the drive of each of the transistors Qu1, Qu4, Qv1, Qv4, Qw1 and Qw4 corresponds to a unidirectional pulse-supplying drive. Moreover, the U-phase current Iu, the V-phase current Iv and the W-phase current Iw are offset in phase from each other. In addition, the period of time from a time instant t1 to a time instant t7 corresponds to one period of the U-phase current Iu; the period of time from a time instant t3 to a time instant t9 corresponds to one period of the V-phase current Iv; the period of time from a time instant t5 to a time instant t11 (not shown) corresponds to one period of the W-phase current Iw.

Consequently, using the U-phase current Iu, the V-phase current Iv and the W-phase current Iw, a synthesized field magnetic flux $\phi f$ can be generated. As a result, it becomes possible to improve the performance and increase the efficiency of the rotating electric machine 10. Moreover, the field magnetic flux $\phi f$ is intensified with increase in the load of the rotating electric machine 10 and weakened with decrease in the load; accordingly, it also becomes possible to realize a desired variable field.

According to the present embodiment, it is possible to achieve the following advantageous effects.

In the present embodiment, the controller 21 controls the electric power converter 20B to perform an intermittent DC energization of the multi-phase coil (i.e., the U-phase, V-phase and W-phase windings 11U-11W) with the U-phase, V-phase and W-phase currents Iu, Iv and Iw offset in phase from each other.

With the above configuration, it is possible to reduce the amount of electric current supplied to the multi-phase coil for obtaining the same output torque (or alternatively the same output electric power) in comparison with the case of performing a constant AC energization of the multi-phase coil.

In the present embodiment, the intermittent DC energization of the multi-phase coil is a unidirectional pulse energization (see FIG. 14). More specifically, the controller 21 intermittently drives the transistors Qu1, Qu4, Qv1, Qv4, Qw1 and Qw4 of the electric power converter 20B separately, thereby performing the unidirectional pulse energization of the multi-phase coil.

Consequently, with the unidirectional pulse energization of the multi-phase coil, it becomes possible to perform efficient and powerful drive of the rotating electric machine 10.

In addition, though the unidirectional pulse energization of the multi-phase coil is performed on the plus region in FIG. 14, it is also possible to perform the unidirectional pulse energization on the minus region.

Sixth Embodiment

A half-wave rectifier 24 according to a sixth embodiment will be described with reference to FIG. 15. The half-wave rectifier 24 can be applied, together with the winding example of a multi-phase coil described in the third embodiment, to both the rotating electric machines 10A and 10B according to the first and second embodiments.

In addition, the half-wave rectifier 24 may be either built in the rotating electric machines 10A and 10B or arranged outside and electrically connected with the rotating electric machines 10A and 10B. Moreover, the half-wave rectifier 24 may be employed together with the electric power converter 20A according to the third embodiment or the electric power converter 20B according to the fifth embodiment.

Figure 15:
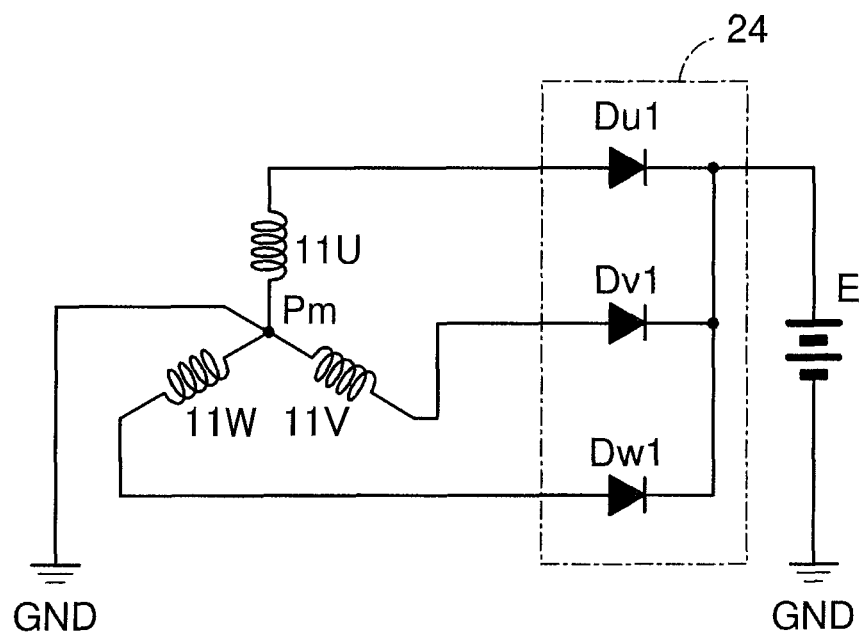
FIG. 15 is a circuit diagram of a half-wave rectifier according to a sixth embodiment.

FIG. 15 shows the configuration of the half-wave rectifier 24. In addition, for the sake of ease of understanding, the U-phase, V-phase and W-phase windings 11U-11W of a multi-phase coil are also schematically shown in FIG. 15. The multi-phase coil may be any of the outer and inner multi-phase coils 11b and 11d included in the rotating electric machine 10A according to the first embodiment (see FIG. 1) and the multi-phase coil 11f included in the rotating electric machine 10B according to the second embodiment (see FIG. 6).

In the present embodiment, the half-wave rectifier 24 is configured with three diodes Du1, Dv1 and Dw1 to half-wave-rectify three-phase electric power generated in the multi-phase coil (i.e., the U-phase, V-phase and W-phase windings 11U-11W) into DC power and charge an electric power source E with the obtained DC power.

The U-phase, V-phase and W-phase windings 11U-11W are Y-connected to define a neutral point Pm therebetween. The neutral point Pm is connected to the ground GND. The diode Du1 is connected, on the opposite side of the U-phase winding 11U to the neutral point Pm, between the U-phase winding 11U and the electric power source E. The diode Dv1 is connected, on the opposite side of the V-phase winding 11V to the neutral point Pm, between the V-phase winding 11V and the electric power source E. The diode Dw1 is connected, on the opposite side of the W-phase winding 11W to the neutral point Pm, between the W-phase winding 11W and the electric power source E.

In addition, though not shown in the figures, the rotor (or rotors) 13 of the rotating electric machine 10 may have small-sized permanent magnets provided therein for self-excitation at the initial stage of start.

According to the present embodiment, it is possible to achieve the following advantageous effects.

In the present embodiment, the half-wave rectifier 24 is provided to half-wave-rectify the three-phase electric power generated in the multi-phase coil (i.e., the U-phase, V-phase and W-phase windings 11U-11W) into DC power and output the obtained DC power to the electric power source E.

Consequently, with the half-wave rectifier 24, the half-wave-rectified DC current (or DC component) flows in each of the U-phase, V-phase and W-phase windings 11U-11W. As a result, it becomes possible to obtain field magnetomotive force without employing an additional field winding.

Other Embodiments

While the above particular embodiments have been shown and described, it will be understood by those skilled in the art that the present invention can also be embodied in various other modes without departing from the spirit of the present invention.

For example, in the first and second embodiments, each of the permanent magnets M1 and M2 is formed in one piece (see FIGS. 5 and 7). However, at least one of the permanent magnets M1 and M2 may be formed of a plurality of permanent magnet segments.

In the first embodiment, each of the field yoke parts 12b and 12d is formed as an integral part of the housing 12 (see FIG. 1). However, it is also possible to: form the entire housing 12 using a nonmagnetic material; form the field yoke parts 12b and 12d separately from the housing 12; and arrange the field yoke parts 12b and 12d inside the housing 12 so that the field yoke part 12b constitutes a part of the magnetic circuit MC1 and the field yoke part 12d constitutes a part of the magnetic circuit MC2.

In the first embodiment, the outer and inner multi-phase coils 11b and 11d are connected with each other by the bridging wires 18 on one axial side (i.e., on the left side in FIG. 1) of the outer and inner armature cores 11a and 11c. However, a continuous electric conductor wire may be wound on the outer and inner armature cores 11a and 11c so as to form a radially outer coil part corresponding to the outer multi-phase coil 11b, a radially inner coil part corresponding to the inner multi-phase coil 11d and a plurality of bridging parts corresponding to the bridging wires 18. Alternatively, a plurality of U-shaped electric conductor segments may be mounted on the outer and inner armature cores 11a and 11c and joined to one another so as to form a radially outer coil part corresponding to the outer multi-phase coil 11b, a radially inner coil part corresponding to the inner multi-phase coil 11d and a plurality of bridging parts corresponding to the bridging wires 18.

In the second embodiment, the multi-phase coil 11f (see FIG. 6) may be formed of either a single electric conductor wire wound on the armature core 11e or a plurality of electric conductor segments mounted on the armature core 11e and joined to one another.

In the second embodiment, the second outer rotor member 13e of the outer rotor 13B, the second inner rotor member 13g of the inner rotor 13c and the soft-magnetic member 19 are formed separately from each other and then fixed together (see FIGS. 6-7). However, the second outer rotor member 13e of the outer rotor 13B, the second inner rotor member 13g of the inner rotor 13c and the soft-magnetic member 19 may be integrally formed into one piece.

What is claimed is:

1. A rotating electric machine comprising:
   at least one multi-phase coil;
   at least one armature core having the at least one multi-phase coil wound thereon; and
   at least one rotor rotatably disposed and having a plurality of magnetic poles facing the at least one armature core,
   wherein
   the at least one multi-phase coil has at least one coil end part protruding from the at least one armature core and surrounded by at least one magnetic circuit formed in the rotating electric machine, and there are a plurality of gaps formed between the at least one armature core and the at least one rotor.

2. The rotating electric machine as set forth in claim 1, further comprising a housing in which the at least one multi-phase coil, the at least one armature core and the at least one rotor are received, wherein the at least one rotor comprises a single rotor, the at least one armature core comprises an outer armature core disposed radially outside the rotor and an inner armature core disposed radially inside the rotor, the at least one multi-phase coil comprises an outer multi-phase coil wound on the outer armature core and an inner multi-phase coil wound on the inner armature core, the at least one coil end part comprises a coil end part of the outer multi-phase coil protruding from the outer armature core and a coil end part of the inner multi-phase coil protruding from the inner armature core, the magnetic poles of the rotor comprises a plurality of first magnetic poles facing the outer armature core and a plurality of second magnetic poles facing the inner armature core, the housing has a first field yoke part facing the coil end part of the outer multi-phase coil and a second field yoke part facing the coil end part of the inner multi-phase coil, the at least one magnetic circuit comprises first and second magnetic circuits, the first magnetic circuit being formed by the outer armature core, the first field yoke part of the housing and the first magnetic poles of the rotor so as to surround the coil end part of the outer multi-phase coil, the second magnetic circuit being formed by the inner armature core, the second field yoke part of the housing and the second magnetic poles of the rotor so as to surround the coil end part of the inner multi-phase coil, and the plurality of gaps comprises an outer radial gap formed between the outer armature core and the rotor and an inner radial gap formed between the inner armature core and the rotor.

3. The rotating electric machine as set forth in claim 2, wherein the rotor is double-ring-structured to have a first ring-shaped part located on a radially outer side and a second ring-shaped part located on a radially inner side, the first ring-shaped part includes the first magnetic poles and serves as an entrance and exit of the first magnetic circuit, the second ring-shaped part includes the second magnetic poles and serves as an entrance and exit of the second magnetic circuit, the first and second ring-shaped parts are arranged so that the first magnetic poles are interleaved with the second magnetic poles, the first magnetic poles have a first polarity, and the second magnetic poles have a second polarity that is opposite to the first polarity.

4. The rotating electric machine as set forth in claim 2, wherein both the coil end parts of the outer and inner multi-phase coils are located on a first axial side of the outer and inner armature cores, and the outer and inner multi-phase coils are electrically connected with each other on a second axial side of the outer and inner armature cores which is opposite to the first axial side.

5. The rotating electric machine as set forth in claim 1, wherein the at least one rotor further has a plurality of magnets each being arranged between one circumferentially-adjacent pair of the magnetic poles.

6. The rotating electric machine as set forth in claim 1, wherein the at least one armature core comprises a single armature core, the at least one multi-phase coil comprises a single multi-phase coil wound on the armature core, the at least one coil end part comprises a coil end part of the multi-phase coil protruding from the armature core, the at least one rotor comprises an outer rotor rotatably disposed radially outside the armature core and an inner rotor rotatably disposed radially inside the armature core, each of the outer and inner rotors having a plurality of magnetic poles facing the armature core, the outer and inner rotors are connected with a soft-magnetic member on one axial side of the outer and inner rotors, the at least one magnetic circuit comprises a magnetic circuit that is formed by the armature core, the outer rotor, the soft-magnetic member and the inner rotor so as to surround the coil end part of the multi-phase coil, and the plurality of gaps comprises an outer radial gap formed between the outer rotor and the armature core and an inner radial gap formed between the inner rotor and the armature core.

7. The rotating electric machine as set forth in claim 6, wherein the magnetic poles of the outer rotor are held by an annular nonmagnetic holding member.

8. The rotating electric machine as set forth in claim 6, wherein the armature core is segmented into a plurality of teeth that are circumferentially spaced from one another.

9. The rotating electric machine as set forth in claim 1, wherein the at least one multi-phase coil is comprised of a plurality of phase windings each of which is a wave-shaped full-pitch winding, and the at least one multi-phase coil generates field magnetic flux upon supply of a DC component to at least one of the phase windings of the at least one multi-phase coil.

10. The rotating electric machine as set forth in claim 9, further comprising an inverter that includes:

an electric power converter having a plurality of full bridges each of which includes one of the phase windings of the at least one multi-phase coil therein, and a controller that controls the electric power converter to supply the DC component to the at least one of the phase windings of the at least one multi-phase coil.

11. The rotating electric machine as set forth in claim 10, wherein the at least one multi-phase coil is a three-phase coil, and the phase windings of the three-phase coil are Y-connected to define a neutral point therebetween, the electric power converter has a first transistor connected to the neutral point of the three-phase coil and a second transistor connected to one of the phase windings of the three-phase coil, and the controller controls drives of the first and second transistors to supply the DC component to the one of the phase windings of the three-phase coil.

12. The rotating electric machine as set forth in claim 10, wherein the controller controls the electric power converter to perform an intermittent DC energization of the at least one multi-phase coil, with phase currents respectively supplied to the phase windings of the at least one multi-phase coil offset in phase from each other, thereby supplying the DC component to the at least one of the phase windings of the at least one multi-phase coil.

13. The rotating electric machine as set forth in claim 12, wherein the intermittent DC energization is a unidirectional pulse energization.

14. The rotating electric machine as set forth in claim 1, further comprising a half-wave rectifier that half-wave-rectifies multi-phase electric power generated in the at least one multi-phase coil into DC power and outputs the obtained DC power.

* * * * *